May 22, 1934.    O. SIMMEN    1,959,769
INTERNAL COMBUSTION ENGINE
Filed Aug. 18, 1931
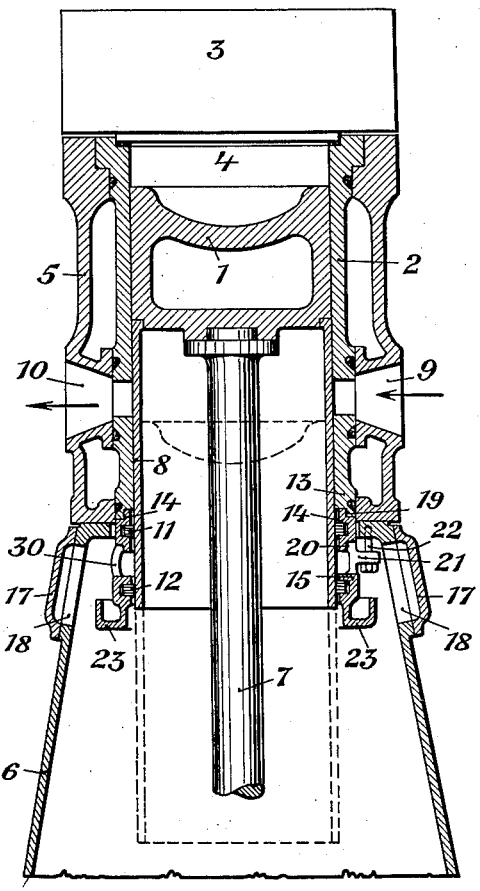
INVENTOR
Oscar Simmen
BY
Pennie, Davis, Marvin & Edmonds
ATTORNEY Patented May 22, 1934

1,959,769

UNITED STATES PATENT OFFICE 1,959,769

INTERNAL COMBUSTION ENGINE

Oscar Simmen, Erlach, Switzerland, assignor to firm Sulzer Freres Societe Anonyme, Winterthur, Switzerland Application August 18, 1931, Serial No. 557,804
In Switzerland August 23, 1930

2 Claims. (Cl. 123—196)

This invention relates to vertically mounted internal combustion engines having lubricant wiping devices arranged in a detachable annular member at the lower cylinder end. The invention has for its object to provide an improved engine of this kind in which the annular member for observing the piston is formed in the manner of a lantern, that is, it contains light openings between its supporting arms for viewing the moving piston or its parts, and is provided with lubricant wiping devices separated from each other by observing openings.

One construction according to the invention as applied to a two-stroke internal combustion engine is diagrammatically illustrated in sectional elevation in the accompanying drawing.

In the construction shown the engine comprises a piston 1 reciprocating within a cylinder liner 2 provided with a cylinder head 3 and having a combustion chamber 4. Surrounding the cylinder liner is the cylinder 5 which is bolted to the supporting standard 6 so that the working stresses are transmitted from the cylinder to the bearings of the crankshaft (not shown) through the standard 6, while the stresses from the piston are transmitted through a piston rod 7 to the crankshaft.

The piston which in the construction shown is at its upper dead centre, is provided with a skirt portion 8 which, in the position shown, serves to close the inlet ports 9 and the exhaust ports 10. When the piston reaches its lower dead centre on the other hand, as indicated in dotted lines, the inlet and exhaust ports 9 and 10 are uncovered by the piston 1 so that the exhaust gases can escape through the outlet ports 10 from the working space and the combustion chamber can be scavenged by air entering through the inlet ports 9.

Arranged at the lower end of the cylinder is a detachable annular member 15 which, for observing the piston, is formed in the manner of a lantern and which is provided with two lubricant wiping devices 11, 12 separated from each other by observing openings 30. Each of the lubricant wiping devices consists of one or more rings. One of the wiping devices prevents carbon and impure lubricant discharged by the piston from reaching the crank case, while the other wiping device prevents lubricant from the crank case from reaching the piston. The annular member 15 may form an integral portion with the upper member 14 or may be inserted independently of the same. In the latter case the annular member 14 is centred by the surface 19 in the lower portion of the cylinder liner 2, while the annular member 15 is centred at the upper annular member 14 by means of lugs 21 contacting with the surface 20. One of those lugs 21 only is shown in the drawing. For the purpose of observing the piston by way of the openings 30, openings 18 are provided in the standard of the engine which may be closed by cover plates 17. By means of bolts passed through holes in the lugs 21 the annular member 15, or in case of subdivision, both annular members 14 and 15 may be screwed against the cylinder liner 2.

The present invention enables the sliding surfaces of the piston skirt 8 to be examined from the exterior, for example for the purpose of ascertaining the temperature or mechanical condition thereof even while the internal combustion engine is working. Thus it can for instance be ascertained whether the lubricating oil or the fuel is depositing dirt or carbon on the wall of the skirt or is forming a crust, and the necessary preventive measures can be taken. The lubricant removed by the two lubricant wiping devices 11, 12 may be directly collected in an annular channel which may be formed on the member 15 and, if desired, the oil may, after the separation of the unuseable oil from useable oil, be discharged for further use.

The present invention may be applied either to single acting or other forms of internal combustion engine of the reciprocating piston type while further, in some cases the two annular members respectively carrying the wiper rings may be constructed so that they are divided axially so as to facilitate their removal.

I claim:—

1. In a vertical internal-combustion engine, a cylinder, a piston reciprocating therein, a separate annular member located at the lower end of said cylinder, said annular member having openings therein, and mounted on the frame to cooperate with the piston and supported at the lower end of the cylinder and having lubricant-wiping devices therein spaced apart from each other and said member being arranged to observe the piston through said observation openings.

2. In a vertical, internal-combustion engine having a cylinder, a piston reciprocating therein, an engine-frame, observation openings in the engine-frame, covering members therefor, a separate annular member located at the lower end of said cylinder, and packing and lubricant-wiping devices positioned in said detachable member, the said annular member having openings therein to provide peep-holes and mounted to cooperate with the piston, and said packing and lubricant-wiping devices being spaced by said openings or peep-holes.

OSCAR SIMMEN.